United States Patent [19]

Matsubara et al.

[11] Patent Number: 4,570,446
[45] Date of Patent: Feb. 18, 1986

[54] FUEL TANK FOR HYDROGEN VEHICLE AND FUEL SUPPLYING SYSTEM

[75] Inventors: Yutaka Matsubara, Kodaira; Hisao Konno, Chofu; Takashi Sasai, Gunma, all of Japan

[73] Assignees: Mitsui & Co., Ltd.; Japan Metals and Chemicals Co., Ltd., both of Tokyo, Japan

[21] Appl. No.: 669,061

[22] Filed: Nov. 7, 1984

[30] Foreign Application Priority Data

May 22, 1984 [JP] Japan ............................... 59-102998

[51] Int. Cl.[4] ............................................. F17C 11/00
[52] U.S. Cl. ....................................... 62/48; 123/1 A; 123/DIG. 12; 423/248
[58] Field of Search ........... 62/48; 123/1 A, DIG. 12; 423/248

[56] References Cited

U.S. PATENT DOCUMENTS

| | | | |
|---|---|---|---|
| 3,732,690 | 5/1973 | Meijer | 123/1 A |
| 4,165,569 | 8/1979 | Mackay | 62/48 |
| 4,214,699 | 7/1980 | Buchner et al. | 62/48 |
| 4,393,924 | 7/1983 | Asami et al. | 62/48 |
| 4,402,187 | 9/1983 | Golben et al. | 62/48 |

*Primary Examiner*—Ronald C. Capossela
*Attorney, Agent, or Firm*—Parkhurst & Oliff

[57] ABSTRACT

A fuel tank for a hydrogen vehicle in which a plurality of fuel cylinders are disposed and contained in a casing of the fuel tank for containing hydrogen storage alloy, the fuel cylinders are connected to a header mounted integrally with the casing for containing the fuel cylinders, a conduit for supplying engine exhaust gas is connected to the casing for externally heating the fuel cylinders in the casing. Further, a fuel supplying system which comprises supplying hydrogen gas from a fuel supply conduit connected to a header mounted integrally with the fuel tank, supplying the hydrogen gas from the openings of a plurality of fuel cylinders into the inner cylinder sections of the fuel cylinders to allow the hydrogen gas to be absorbed to hydrogen storage alloy of the respective fuel cylinders, supplying air or water from an engine exhaust gas passage of a fuel tank casing into the casing in case of supplying the hydrogen while cooling the fuel cylinders from the exterior, closing the fuel supply conduit of the header after filling the hydrogen gas of a predetermined amount, and then supplying the exhaust gas through the engine exhaust gas passage to externally heat the fuel cylinders in case of desorbing the hydrogen gas in the fuel tank. Thus, the fuel tank can desorb or absorb hydrogen under a relatively low pressure and can store the hydrogen in the amount corresponding to the running distance of a gasoline vehicle in a compact structure.

11 Claims, 4 Drawing Figures

FUEL TANK FOR HYDROGEN VEHICLE AND FUEL SUPPLYING SYSTEM

BACKGROUND OF THE INVENTION

This invention relates to a fuel tank for a hydrogen vehicle and a fuel supplying system.

Recently, a vehicle which uses as fuel gasoline constitutes a social problem due to public pollution by exhaust gas discharged from the vehicle, and a vehicle which employs hydrogen gas as fuel and does not cause a public pollution is being developed at present.

However, since combustion reaction of hydrogen in the vehicle which employs hydrogen as fuel is remarkably faster than the combustion velocity of gasoline in the conventional vehicle which employs the gasoline as fuel, it is difficult to convert the combustion energy of the hydrogen into mechanical energy, and it is necessary to develop a new engine adapted therefor.

On the other hand, the hydrogen vehicle cannot employ a simple fuel tank like a conventional gasoline tank because the hydrogen is in gas phase at ambient temperatures. To this end, a variety of hydrogen storage alloys have been developed to absorb and desorb the hydrogen. It is desired to urgently develop a fuel tank capable of absorbing a considerable amount of hydrogen safely in the same manner as the conventional gasoline vehicle with the hydrogen absorption alloys, but such fuel tank which can sufficiently satisfy the safety factor has not yet been developed.

SUMMARY OF THE INVENTION

It is an object of this invention to provide a fuel tank for a hydrogen vehicle which can desorb or absorb hydrogen under a relatively low pressure and can store the hydrogen in the amount corresponding to the running distance of a gasoline vehicle in a compact structure.

According to one aspect of the present invention, there is provided a fuel tank for a hydrogen vehicle in which a plurality of fuel cylinders are disposed and contained in a casing of the fuel tank for containing hydrogen storage alloy, the fuel cylinders are connected to a header mounted integrally with the casing for containing the fuel cylinders, a conduit for supplying engine exhaust gas is connected to the casing for externally heating the fuel cylinders in the casing.

According to another aspect of the present invention, there is provided a fuel supplying system which comprises supplying hydrogen gas from a fuel supply conduit connected to a header mounted integrally with the fuel tank, supplying the hydrogen gas from the openings of a plurality of fuel cylinders into the interiors of the inner cylinder sections of the fuel cylinders to allow the hydrogen gas to be absorbed to hydrogen storage alloy filled between the outer cylinder section and the inner cylinder sections of the respective fuel cylinders through ultrafine pores formed at the inner cylinder sections, supplying air or water from an engine exhausts gas passage of a fuel tank casing into the casing in case of supplying the hydrogen while cooling the fuel cylinders from the exterior, closing the fuel supply conduit of the header after rilling the hydrogen gas of a predetermined amount, and then supplying the exhaust gas through the engine exhaust gas passage to externally heat the fuel cylinders in case of desorbing the hydrogen gas in the fuel tank.

The fuel cylinder of the fuel tank of the present invention is composed of an inner cylinder section formed with a number of ultrafine pores and an outer cylinder section in a double structure, and hydrogen storage alloy for absorbing or desorbing the hydrogen gas is filled between the inner cylinder section and the outer cylinder section. The hydrogen storage alloy used in the fuel tank of the invention desirably has 10 kg/cm$^2$ or lower, and preferably 5 to 3 kg/cm$^2$ of hydrogen absorbing and desorbing pressures at the vicinity of ambient temperatures. To this end, the hydrogen storage alloy may employ lanthanum pentanickel LaNi$_5$ alloy, mischmetal-nickel alloys or mischmetal alloys containing high content of lanthanum, Ti—Zn—Mn—Cr—Cu alloys, or Mg based alloys.

The heat transfer property of the hydrogen storage alloys is preferably improved. For that purpose, 2 to 5 wt. % of acicular aluminum is preferably mixed with the hydrogen storage alloys.

The inner and outer cylinder sections of the fuel cylinder is preferably formed of stainless steel by considering the heat resistance and durability of the cylinder sections, and the inner cylinder section may also be formed of metal gauze of stainless steel.

One end of the outer cylinder section of the fuel cylinder is closed, and an opening is formed at the other end to communicate with the interior of the inner cylinder section. A plurality of the fuel cylinders are disposed and contained in the casing of the fuel tank, and the openings of a plurality of fuel cylinders are bundled to communicate with a header mounted integrally in the casing.

On the other hand, and exhaust gas passage which guides the exhaust gas of a vehicle engine is formed in the casing of the fuel tank to externally heat the plurality of fuel cylinders in the casing.

When filling the hydrogen gas in the fuel tank of the invention, the fuel cylinders are evacuated through the fuel supply conduit mounted at the header before supplying the hydrogen gas into the fuel cylinders to sufficiently evacuate the air in the plurality of fuel cylinders and the heater.

Then, the hydrogen gas is supplied from the fuel supply conduit of the heater. The hydrogen gas is supplied from the fuel supply conduit of the header through the header into the openings of the plurality of fuel cylinders into the interiors of the inner cylinder sections to allow the hydrogen gas to be absorbed by the hydrogen storage alloy through the ultrafine pores formed at the inner cylinder section.

Since the reaction in case the hydrogen gas is absorbed or occluded into the hydrogen storage alloy is exothermic, air or water is supplied from the engine exhaust gas passage of the casing of the fuel tank into the casing in case of supplying the hydrogen gas into the fuel tank to supply the hydrogen gas while externally cooling the plurality of fuel cylinders, and the fuel supply conduit of the header is then closed after a predetermined amount of hydrogen gas is filled in the fuel tank.

Since the reaction when the hydrogen gas of the fuel tank is then desorbed in endothermic contrary to the absorption of the hydrogen by the hydrogen storage alloy described above, the exhaust gas is supplied through the engine exhaust gas passage mounted in the casing of the fuel tank to externally heat the plurality of fuel cylinders. In this case, the desorbing pressure of the hydrogen gas from the hydrogen storage alloy is 10 kg/cm$^2$ or lower and preferably 5 to 3 kg/cm$^2$ similar to the absorption of the hydrogen by the hydrogen storage alloy as described above.

The reason why the absorbing and desorbing pressures of the hydrogen is 10 kg/cm² or lower in the present invention is because, in case of 10 kg/cm² or higher, it is restricted by the application of the stipulation of Japanese High Pressure Restriction Law, the materials and pipings of the casing, fuel cylinders used in the fuel tank should be those which can endure against high pressure, so that the materials should be restricted complicatedly, with the result that the materials become heavy and expensive as well as dangerous in actual vehicles.

Since the plurality of fuel cylinders of the fuel tank of the invention is externally heated by the exhaust gas of the hydrogen gas engine as a heat source of the case of desorbing the hydrogen gas from the hydrogen storage alloy, a special separate heat source is not necessary to desorb the hydrogen gas from the hydrogen storage alloy, thereby constructing the fuel tank in a compact structure. Further, the present invention can be applied to the conventional hydrogen gas engine, and the present invention is particularly effective for the hydrogen-water engine in which atomized water is mixed with the hydrogen gas.

More particularly, since the exhaust gas of the engine in case of hydrogen solely becomes considerably high temperature (approx. 1,000° C.), the fuel cylinders cannot be heated as they are, but the exhaust gas should be supplied to the fuel tank while suitably cooling the exhaust gas. However, the exhaust gas of the hydrogen-water engine is lower than the former at the temperature, and the exhaust gas can be supplied to the fuel tank as it is without forcibly cooling the exhaust gas, thereby reducing the weight and size of the fuel tank.

In addition, since the header is mounted separately from the fuel tank in the conventional hydrogen fuel tank, the header vibrates during the travelling of the vehicle, and the hydrogen gas might be accordingly leaked. However, since the header is mounted integrally with the fuel tank in the present invention, the header might not vibrate, and the entire assembly can be constructed compactly.

According to the present invention as described above, the fuel cylinders which fill hydrogen gas in the hydrogen storage alloy under the absorbing and desorbing pressures of 10 kg/cm² or lower are disposed in the casing of the fuel tank, the hydrogen gas can be respectively filled in or exhausted from the fuel tank under the absorbing and desorbing pressures of 10 kg/cm² by externally cooling or heating the plurality of fuel cylinders. Therefore, the hydrogen gas can be handled substantially in the same simple manner as the conventional gasoline engine. Since the fuel tank of the invention can be further reduced in weight and size, the fuel tank can be excellently used in the actual vehicle.

These and other objects and features of the present invention will be obvious from the following detailed description of the invention will be best understood when read in connection with the accompanying drawings.

DESCRIPTION OF THE PREFERRED EMBODIMENTS

An embodiment of the present invention will now be described in detail with reference to the accompanying drawings.

Figure 1:
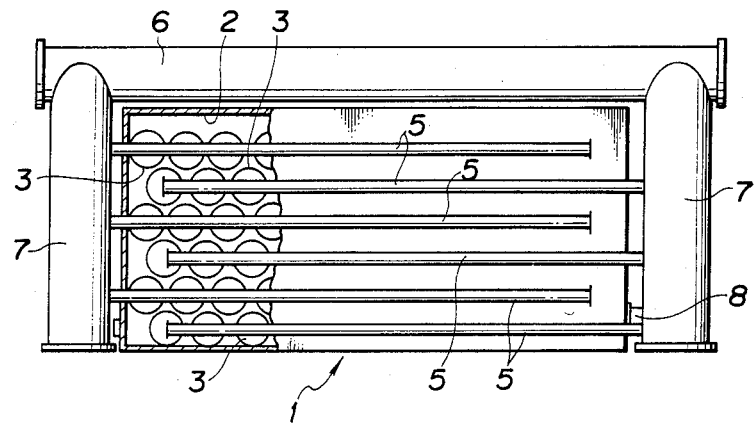
FIG. 1 is a fragmentarily front view of an embodiment of a fuel tank for a hydrogen vehicle constructed according to the present invention.
Figure 2:
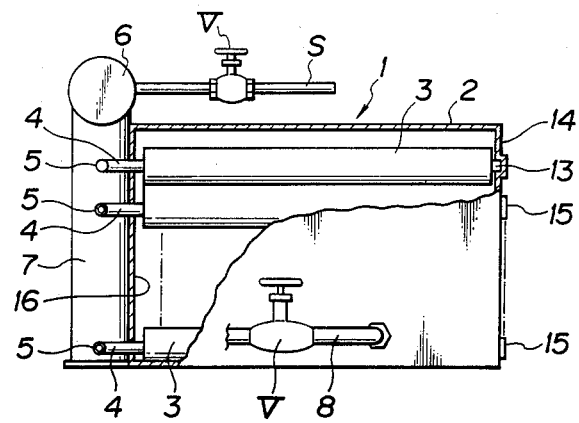
FIG. 2 is a fragmentarily side view of the fuel tank.

FIGS. 1 and 2 show an embodiment of a fuel tank according to the present invention. In the embodiment shown in FIGS. 1 and 2, in a fuel tank 1 is disposed and contained a plurality of cylindrical fuel cylinders 3 in a casing 2. The fuel cylinders 3 are arranged so that a plurality of openings 4 disposed in the same plane are respectively connected to conduits 5 disposed horizontally.

On the other hand, a header 6 formed in a gate shape is mounted integrally with the casing 2 in front of the casing 2, and the conduits 5 connected to the openings 4 of the plurality of fuel cylinders 3 disposed in the same plane are alternately connected to the left and right post portions 7 of the header 6 for each plane.

An exhaust gas conduit 8 for supplying engine exhaust gas is mounted on one side wall of the casing 2, and an exit (not shown) for the exhaust gas is formed at the side wall opposite to the side wall of the casing 2. In FIG. 2, reference character S designates a hydrogen gas conduit, and V designates a valve.

Figure 3:
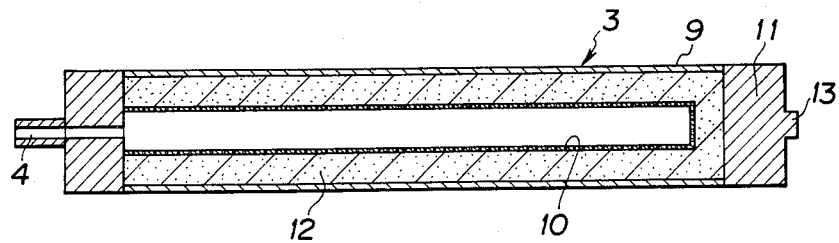
FIG. 3 is a sectional view of one example of the fuel cylinder used in the fuel tank of the invention.

FIG. 3 is an enlarged sectional view of one example of the fuel cylinder used in the fuel tank of the invention. The fuel cylinder 3 is composed of an outer cylinder section 9 and an inner cylinder section 10. A cover 11 is mounted sealingly on one end of the outer cylinder section 9, the opening 4 is formed at the other end of the outer cylinder section 9 to communicate with the interior of the inner cylinder section 10. Hydrogen storage alloy 12 (containing 2 to 5 we. % of acicular aluminum) is filled between the outer cylinder section 9 and the inner cylinder section 10. A number of ultrafine pores are formed at the inner cylinder section 10 to be able to absorb and desorb the hydrogen gas.

The plurality of fuel cylinders 3 in the casing 2 are necessarily disposed in a small gap therebetween, and a connector 13 is mounted on the outside surface of the cover 11 closed on one end of each fuel cylinder 3 therefor. The connector 13 is engaged with a recess 15 formed on the wall 15 of the back surface of the casing 2, and the other end of the fuel cylinder 3 is constructed to clamp the plurality of fuel cylinders 3 via the wall 16 of the front side of the casing 2.

In operation for filling the hydrogen gas in the fuel tank 1, the hydrogen gas is supplied from the hydrogen gas conduit 5 while supplying air or water from the exhaust gas conduit 8. The hydrogen gas is supplied through the header 6 and the conduit 5 into the interiors of the inner cylinder sections 10 of the plurality of fuel cylinders 3 in the casing 2, and further absorbed into the hydrogen storage alloy 12 through the ultrafine pores of the inner cylinder sections 10 of the fuel cylinders 3.

After the hydrogen gas is absorbed to the fuel tank while cooling the fuel cylinders 3 in the fuel tank as described above, the valve V of the hydrogen gas conduit S is closed, and the air or water supply from the exhaust gas conduit 8 is stopped.

Then, in operation for desorbing the hydrogen gas from the fuel tank 1, the exhaust gas of the engine is supplied from the exhaust gas conduit 8 to externally heat the plurality of fuel cylinders 3, and valve V of the hydrogen gas conduit S is opened. Then, the hydrogen gas desorbed from the hydrogen storage alloy 12 by the external heat is desorbed from the alloy through the ultrafine pores of the inner cylinder sections 10 of the fuel cylinders 3 into the interiors of the inner cylinder sections 10 in the fuel tank, and exhausted through the openings 4, and the header 6 from the hydrogen gas conduit S. Particularly in the present invention, since the acicular aluminum is mixed with the hydrogen storage alloy 12 in the fuel cylinders 3, the heat transfer property of the hydrogen storage alloy 12 can be largely improved.

Since the hydrogen storage alloy used in the present invention can absorb or desorb the hydrogen gas under the pressure of 10 kg/cm$^2$ and preferably 5 to 3 kg/cm$^2$, the fuel tank can be handled under the low pressure and the materials for the fuel tank and piping can employ not particularly restricted one. Therefore, the fuel tank of the invention is inexpensive and can be reduced in weight and size in a compact structure.

Figure 4:
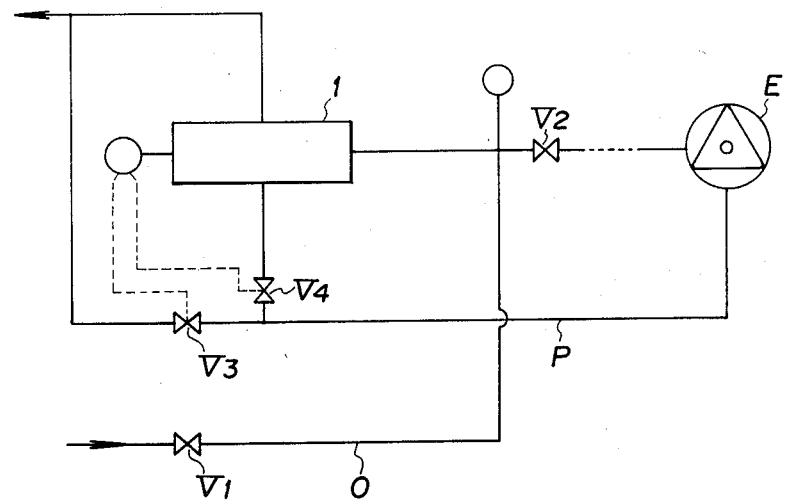
FIG. 4 is a flowchart showing an example of absorbing and desorbing the hydrogen gas.

FIG. 4 shows an example of a flowchart for absorbing and desorbing hydrogen gas in the fuel tank of the invention. The hydrogen gas is supplied from the conduit O by opening the valve $V_1$ and closing the valve $V_2$, and supplied through a pressure gauge PL to the fuel tank 1.

After the hydrogen gas is filled completely, the hydrogen gas is supplied to the engine E to burn the hydrogen gas in the engine by closing the valve $V_1$ and opening the valve $V_2$.

On the other hand, the exhaust gas of the engine E is exhausted via the exhaust gas pipe P, supplied to the fuel tank 1 by closing the valve $V_1$ and opening the valve $V_2$, thereby externally heating the plurality of fuel cylinders to desorb the hydrogen gas from the fuel tank. In this case, a temperature controller TIC mounted at the fuel tank 1 detects the exhaust gas temperature. When the exhaust gas temperature is suitable, the valve $V_3$ is closed, the valve $V_4$ is opened while when the exhaust gas temperature is raised, the temperature controller actuates to open the valve $V_3$ and to closed the valve $V_4$, thereby externally exhausting the exhaust gas. Therefore, in the present invention, when the exhaust gas temperature is high, the exhaust gas is not supplied into the fuel tank 1. However, when the hydrogen-water engine is used, the exhaust gas temperature is relatively low, and it is particularly advantageous.

As an example, the fuel tank of the present invention can fill hydrogen gas of nine hydrogen bombs in sixty-five fuel cylinders, and can obtain performance capable of the conventional gasoline engine which can travel in the distance of approx. 350 km.

What is claimed is:

1. A fuel tank in a fuel supplying device for a hydrogen vehicle having a hydrogen-water engine comprising:
   a casing for the fuel tank,
   a header mounted integrally with said fuel tank,
   a plurality of fuel cylinders disposed in said casing and connected to said header for respectively containing hydrogen storage alloy selected from the group consisting of LaNi$_5$, mischmetal alloys, Ti-Zr-Mn-Cr-Cu alloys and Mg light alloys,
   a hydrogen gas supply conduit connected to said header, and
   an exhaust gas supply conduit connected to said casing for supplying the exhaust gas to externally heat said fuel cylinders in said casing.

2. The fuel tank according to claim 1, wherein said fuel cylinder has a double wall cylinder composed of an outer cylinder section and an inner cylinder section, a cover member provided at one end thereof and sealingly closed at the one end thereof and in communication with the interior of said inner cylinder section at the other end thereof.

3. The fuel tank according to claim 2, wherein said inner cylinder section is formed with a number of ultrafine pores for guiding the hydrogen gas to be absorbed and desorbed by the hydrogen storage alloy.

4. The fuel tank according to claim 2, wherein the openings of said fuel cylinders are respectively connected to a plurality of conduits which communicate with the post members of said header and are arranged horizontally between the post members of said header.

5. The fuel tank according to claim 2, wherein a connector member is projected from the cover member at one end of said fuel cylinder, engaged with a recess formed on the side wall of said casing, and supported in said casing by integrally forming the conduit arranged between the post members of said header with the connector member of the other end of said fuel cylinder.

6. The fuel tank according to claim 1, wherein said hydrogen storage alloy is filled between the inner cylinder section and the outer cylinder section.

7. The fuel tank according to claim 1, wherein said header is formed in a gate shape with hollow post members at both sides and disposed in front of said casing.

8. The fuel tank according to claim 1, wherein an exist for exhausting the exhaust gas and air or water for cooling is formed at the side wall of said casing.

9. The fuel tank according to claim 1, wherein the hydrogen storage alloy filled in said fuel cylinder is at least one selected from the group consisting of LaNi$_5$, mischmetal alloys, Ti—Zr—Mn—Cr—Cu alloys and Mg light alloys.

10. The fuel tank according to claim 1, wherein the hydrogen storage alloy comprises a acicular aluminum.

11. A fuel supplying system for a hydrogen vehicle having a hydrogen-water engine comprising:
   means for supplying hydrogen gas from a fuel supply conduit connected to a header mounted integrally with the fuel tank,
   means for supplying the hydrogen gas from the openings of a plurality of fuel cylinders into the interiors of the inner cylinder sections of the fuel cylinders to allow the hydrogen gas to be absorbed to hydrogen storage alloy filled between the outer cylinder section and the inner cylinder sections of the respective fuel cylinders through ultrafine pores formed at the inner cylinder sections, said hydrogen storage alloy being selected from the group consisting of LaNi$_5$, mischmetal alloys, Ti—Zr—Mn—Cr—Cu alloys and Mg light alloys,
   means for supplying air or water from an engine exhaust gas passage into a casing for said fuel cylinders when supplying the hydrogen to the fuel cylinders while cooling the fuel cylinders from the exterior,
   means for closing the fuel supply conduit of the heater after filling the fuel cylinders with a predetermined amount of hydrogen gas, and
   means for supplying the hydrogen gas to the hydrogen water engine to drive the engine, introducing the exhaust gas generated thereby into the fuel tank to heat the fuel tank and continuously driving the engine by exhausting the hydrogen from the hydrogen storage alloy in the fuel cylinder.

* * * * *